United States Patent
Schulz et al.

(10) Patent No.: US 7,661,437 B2
(45) Date of Patent: Feb. 16, 2010

(54) FOOD AND BEVERAGE INDUSTRY MEMBRANE VALVE STRUCTURE

(75) Inventors: Dieter Schulz, Bochum (DE); Frank Baumbach, Soest (DE)

(73) Assignee: APV Rosista GmbH, Unna (DE)

( * ) Notice: Subject to any disclaimer, the term of this patent is extended or adjusted under 35 U.S.C. 154(b) by 546 days.

(21) Appl. No.: 11/399,298

(22) Filed: Apr. 6, 2006

(65) Prior Publication Data

US 2006/0273206 A1    Dec. 7, 2006

(30) Foreign Application Priority Data

Apr. 9, 2005    (DE) .................. 10 2005 016 387

(51) Int. Cl.
*F16K 7/16* (2006.01)
*F16K 1/36* (2006.01)
(52) U.S. Cl. ............... 137/312; 251/331; 251/335.2
(58) Field of Classification Search ............ 137/312; 251/331, 335.2
See application file for complete search history.

(56) References Cited

U.S. PATENT DOCUMENTS

| | | | |
|---|---|---|---|
| 3,182,678 A | 5/1965 | Dahl | |
| 4,856,757 A * | 8/1989 | Dall'Aglio | 251/335.2 |
| 6,786,470 B2 * | 9/2004 | Newberg | 251/331 |

FOREIGN PATENT DOCUMENTS

| | | |
|---|---|---|
| DE | 458931 | 4/1928 |
| DE | 2818633 C2 | 5/1989 |
| DE | 69508865 T2 | 12/1999 |
| EP | 1413812 A2 | 4/2004 |
| GB | 319936 | 10/1929 |
| GB | 319961 | 10/1929 |
| GB | 533116 | 2/1941 |

\* cited by examiner

*Primary Examiner*—Kevin L Lee
(74) *Attorney, Agent, or Firm*—Baker & Hostetler LLP

(57) ABSTRACT

A food and beverage industry membrane valve structure with a membrane which separates a control compartment from a product compartment in a food or beverage handling or processing machine. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

19 Claims, 12 Drawing Sheets

FOOD AND BEVERAGE INDUSTRY MEMBRANE VALVE STRUCTURE

BACKGROUND

1. Technical Field

The present application relates to a food and beverage industry membrane valve structure for use in food or beverage processing or handling. The membrane valve structure is utilized to control the movement of food or beverages through a chamber in a food or beverage processing or handling machine.

The present application further relates to a membrane valve with a membrane which is mounted in a sealed manner in a valve housing and separates the control chamber and/or the movable valve rod from the product chamber, with a support device for the stabilization of the membrane used as described herein below.

2. Background Information

In general, membrane valves are valves that utilize a thin flexible membrane to separate chambers in a device to contain a product, such as, in the present application, a food or beverage, in one chamber, while simultaneously minimizing the entry of food or beverage product into the other chamber or chambers. The membrane valve also protects the food or beverage product from contamination by contaminants from the other chamber or chambers, such as dust or dirt. This function is important to protect the food or beverage product. The membrane valve must be sufficiently thin to be sufficiently flexible to permit movement of a corresponding valve stem, but also must be sufficiently thick to be strong enough to withstand wear and tear during operation of the membrane valve. Such wear and tear can be caused by the movement of the valve during operation, as well as by pressure that can build up in the chamber, which pressure can cause deformations in the membrane.

Membrane valves of this type include, for example, pneumatically controlled pressure governor valves or pressure vessel valves to maintain constant process pressures in industrial process equipment, in the food and/or beverage industry, for example, as well as in the pharmaceutical and chemical industry. The functional principle of maintaining a constant pressure is based on reducing or enlarging the open flow cross section at the valve seat by means of the adjustable valve stem which is connected with the regulation membrane. Membrane valves of this type are used for the general actuation of product flows. Thin disc membranes made of PTFE are used as a seal between the valve housing that is incorporated into the pipeline and the movable stem rod. Disc membranes of this type have are fixed on the outside and on the inside, or they are fixed only on the outside and on the inside are connected in one piece with the stem. The disc membranes must on one hand be thin and flexible so that they can easily track the movement of the stem rod, and on the other hand they must be capable of withstanding the pressure forces exerted by the product. The product pressure results in a gradual deformation of the membrane in the pressure-bearing area and finally leads to the rupture of the membrane. Tensile forces also act on the inner and outer membrane fastenings, which have a negative impact on the quality of the seal and on the useful life of the membrane. In real installations, especially during startup, pressure peaks frequently occur as a result of defects in the operation and control of the process. The membrane material also has a lower strength at elevated temperatures, e.g. at the temperatures used for steam sterilization. To relieve the pressure on the disc membrane, membrane supports on the side facing away from the pressure are known, such as those that are made rubber with vulcanized fabric plies, or movable metal segments that are supported internally or externally.

On control valves of the prior art, the configuration of the membrane wall represents a problem. For a variety of reasons, this membrane wall must often have a significantly larger diameter than the part of the movable valve body that is fastened to the membrane wall. This makes it difficult to achieve a high control accuracy. More precisely, the problem is that the membrane wall must simultaneously have two different properties, namely mechanical strength on one hand and on the other hand flexibility in response to small pressure fluctuations between the pressures that prevail on the opposite sides of the membrane wall.

An additional problem occurs when the membrane wall is intended to be in contact with a process fluid. In that case, there are specific requirements with regard to the hygienic construction of the membrane wall and of the control valve as a whole, which means that the side of the control valve that faces the process fluid must not have any spaces that are difficult for a cleaning fluid to access. In additional, there must be essentially no risk of the discharge or escape of the process control fluid through the areas of the membrane wall in which the wall is fastened to the valve housing and to the valve body. This requirement is particularly important in the case of control valves that are used in the foods industry.

U.S. Pat. No. 3,182,678 discloses a control valve of the type described above in which the membrane wall, which comprises two membrane parts, has a support device that is located between the membrane parts. This support device is in the shape of a disc which, starting from the central section of the membrane parts, extends outward in the radial direction for a specified distance. When a support device of this type is used, the load on the membrane parts during the movement of the valve body is so great that the valve as a whole has only a comparatively short useful life. DE 458 931 C2 describes a control valve in which the membrane wall comprises a single membrane part, on the one side of which is located a support device in the form of a disc that is provided with slots that run radially and that covers practically the entire exposed surface of the one side of the membrane part. During the operation of this control valve, the disc-shaped support element is deformed conically by the relative movements between the valve body and the valve housing. Consequently, the outer ends of the membrane parts, which extend beyond the outer periphery of the disc-shaped support element and are clamped inside the valve housing, are subjected to a relatively strong load in the axial direction. When a thin membrane part is used, the useful life of the membrane and of the valve is relatively short.

DE 28 18 633 C2 describes a control valve with a membrane valve which is clamped in a sealed manner in a valve housing in which it separates two chambers from each other, whereby the chambers can be pressurized at different pressures, and with a valve body which is fastened to a central area of the membrane wall and can be moved to act on valve seat in the axial direction by or through the membrane wall, whereby the membrane wall has two separate membrane parts, each of which is located on one side of the membrane wall and faces the corresponding chamber, and a support device is provided between the membrane parts, whereby the support device comprises a plurality of rigid support elements that are separated from one another, and one end of each support element is rotationally connected with the valve body.

EP 1 413 812 A2 also describes a membrane valve with a membrane which is mounted in a sealed manner in a valve housing and separates the control chamber and/or the movable valve stem rod from the product chamber, with a support device for the stabilization of the membrane used.

GB 533 116 describes the configuration of the mounting of a valve spindle through or by a membrane support part.

DE 695 08 865 T2 describes the configuration of a detachable, sealing membrane support and spindle bearing ring.

GB 319 936 and GB 319 961 also show membrane supports that are connected by threaded fasteners to a spindle that can be rotated into a closed position and into an open position and can be driven by it or track its movement. The solution of the object of the present application cannot be inferred from these prior art documents.

OBJECT OR OBJECTS

The object is therefore to thoroughly improve a control valve of single-seat valve of the type described above, so that it can also be used in sterile operations, can be cleaned and/or sterilized easily and is realized with the fewest possible components compared to the valve configurations of the prior art.

SUMMARY

The present application teaches a membrane valve with a membrane which is mounted in a sealed manner in a valve housing and separates a control compartment or a movable valve rod from the product compartment, with a serrated support device for the stabilization and support of the inserted membrane, characterized in that a stationary serrated lock washer is detachably mounted in the valve housing, and in its operating position is simultaneously realized in the form of a radial shaft guide.

Accordingly, the advantage of the realization claimed by the present application comprises the support of the membrane over almost its entire surface during the entire stem movement of such valves and/or during the reciprocating movement of the stem. An additional advantage of the present application is its extremely simple construction with a correspondingly small number of components and their special association with one another.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail below on the basis of one exemplary embodiment that is illustrated in the accompanying drawings, with reference to a general example of the prior art that is illustrated in FIGS. 1-3.

In the drawings.

DESCRIPTION OF EMBODIMENT OR EMBODIMENTS

Figure 1:
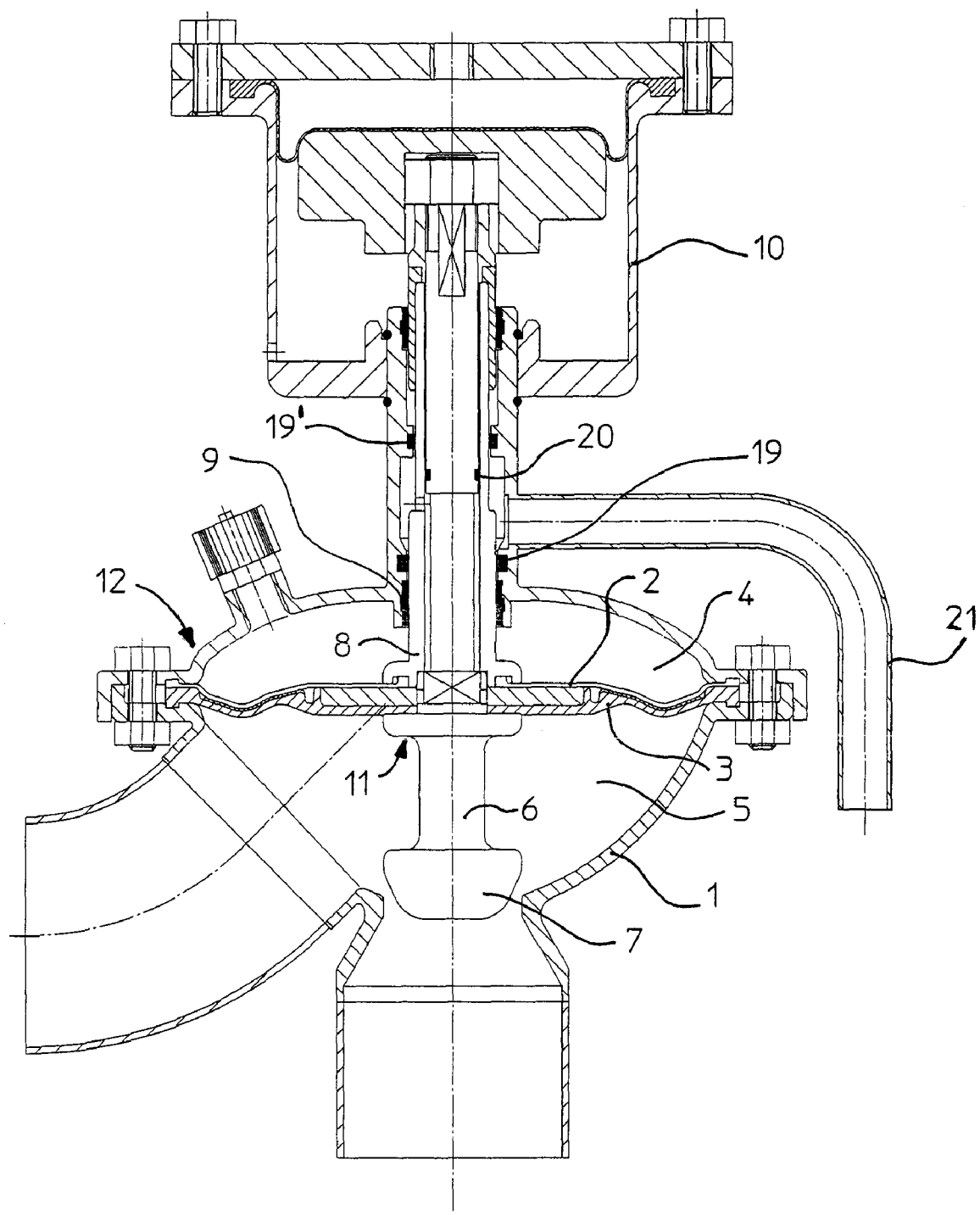
FIG. 1 shows a cross section through a membrane valve of the prior art which is realized in the form of a pressure governor valve.

In the exemplary embodiment illustrated in FIG. 1, the membrane valve which is realized in the form of a pressure governor valve comprises a valve housing 1, in the interior of which is clamped a sealing double membrane with an upper membrane 2 and a lower membrane 3. These membranes 2, 3 divide the valve housing 1 into an upper control chamber 4 and a lower product chamber 5. In the product chamber 5 there is a lower valve stem 6 with a control valve 7. The upper control chamber 4 houses the upper valve stem 8, which leads through the valve housing 1 through a guide 9 to a booster 10 which is also used. The valve stems 6, 6' have a central clamping point 11 for the membranes 2, 3, which for their part are held on a clamping plate 11'. The outer edge of these membranes 2, 3 is held in a sealed manner in an outer clamping point 12.

Figure 2:
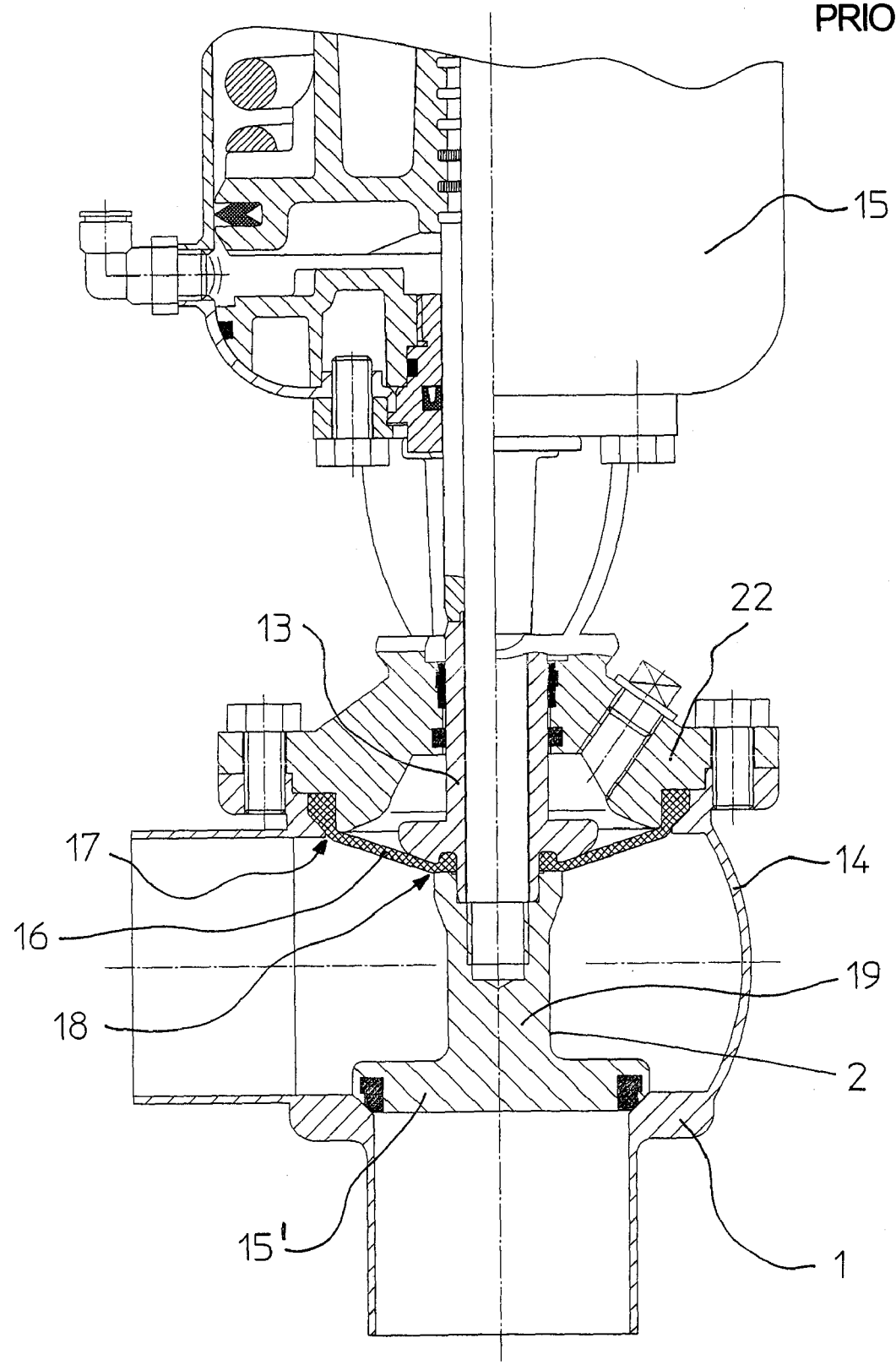
FIG. 2 shows a cross section through a single-seat valve of the prior art.

FIG. 2 shows an additional valve in which the realization of the present application that will be described below can be used. This valve is realized in the form of a single-seat valve with a movable stem rod 13 which can be actuated by a servomotor 15 that is located outside the valve housing 14 and switches the valve 15' accordingly. A thin disc membrane 16 is provided as the seal between the valve housings 14 and 19 of the movable stem rod 13, whereby the valve housings are located in a pipeline. Disc membranes of this type have outer and inner clamping points 17, 18. Models of such membranes are known which have only an outer clamping point 17 and are inwardly connected in one piece with the valve stem 19.

Figure 3:
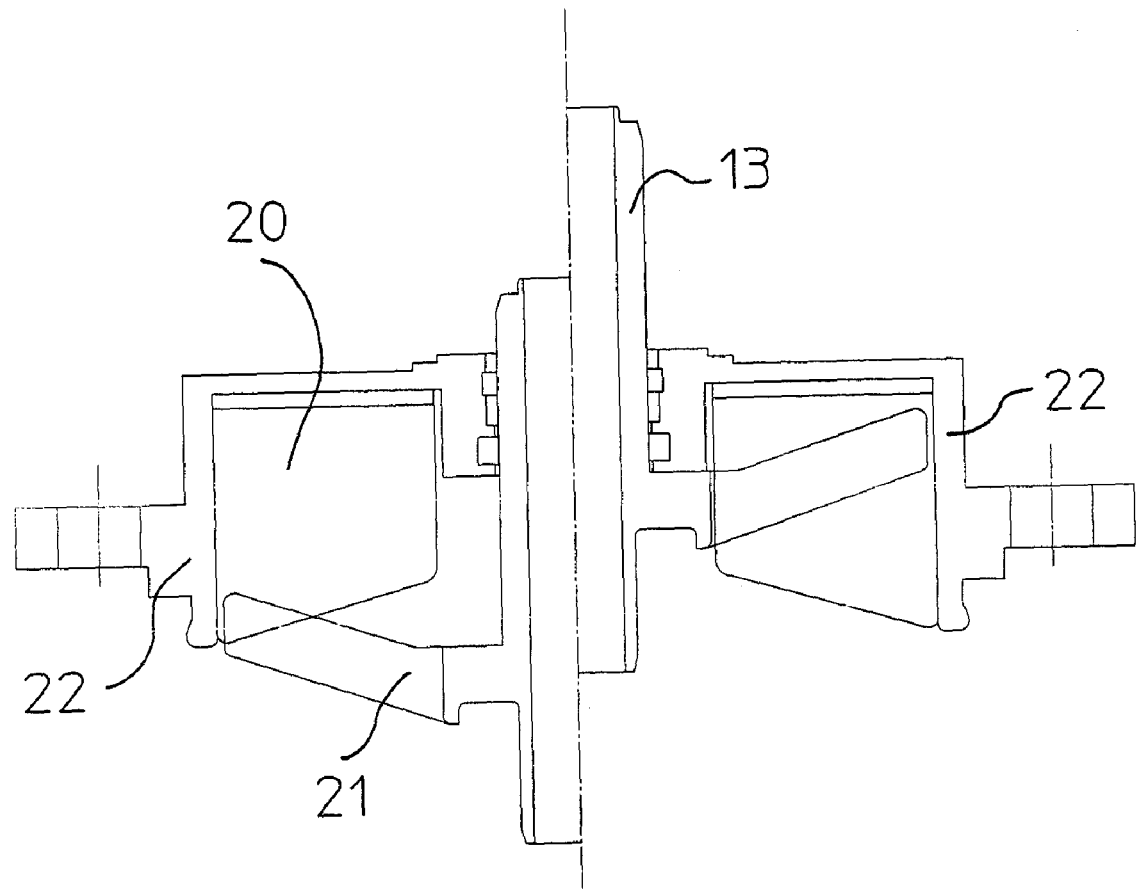
FIG. 3 shows one exemplary embodiment of an advantageous support device for the stabilization of the installed membrane as additional prior art.

FIG. 3 shows an exemplary embodiment of a support device for the stabilization of the membranes 2, 3 and 16 claimed by the present application, which comprises support elements 20, 21 that can be moved into one another in the manner of a serrated lock washer. A first support element in the form of a serrated lock washer 20 is thereby supported in the cover 22 of the valve housing, and the second support element in the form of the serrated stem 21 is located on the movable stem rod 13.

The serrated stem 21 can be moved with its webs 23, which are preferably arranged in the shape of a star, into and out of the spaces 24 between the serrations of the serrated lock washer 20 during the switching process. During the switching movements of the stem rod 13, at least some of the spaces and webs of the serrated lock washer 20 and of the serrated stem 21 penetrate one another. In this manner, an optimal support plane is formed for the membranes 2, 16 in all switched and moving positions and planes, i.e. during the entire reciprocating movement of the stem.

Figure 4:
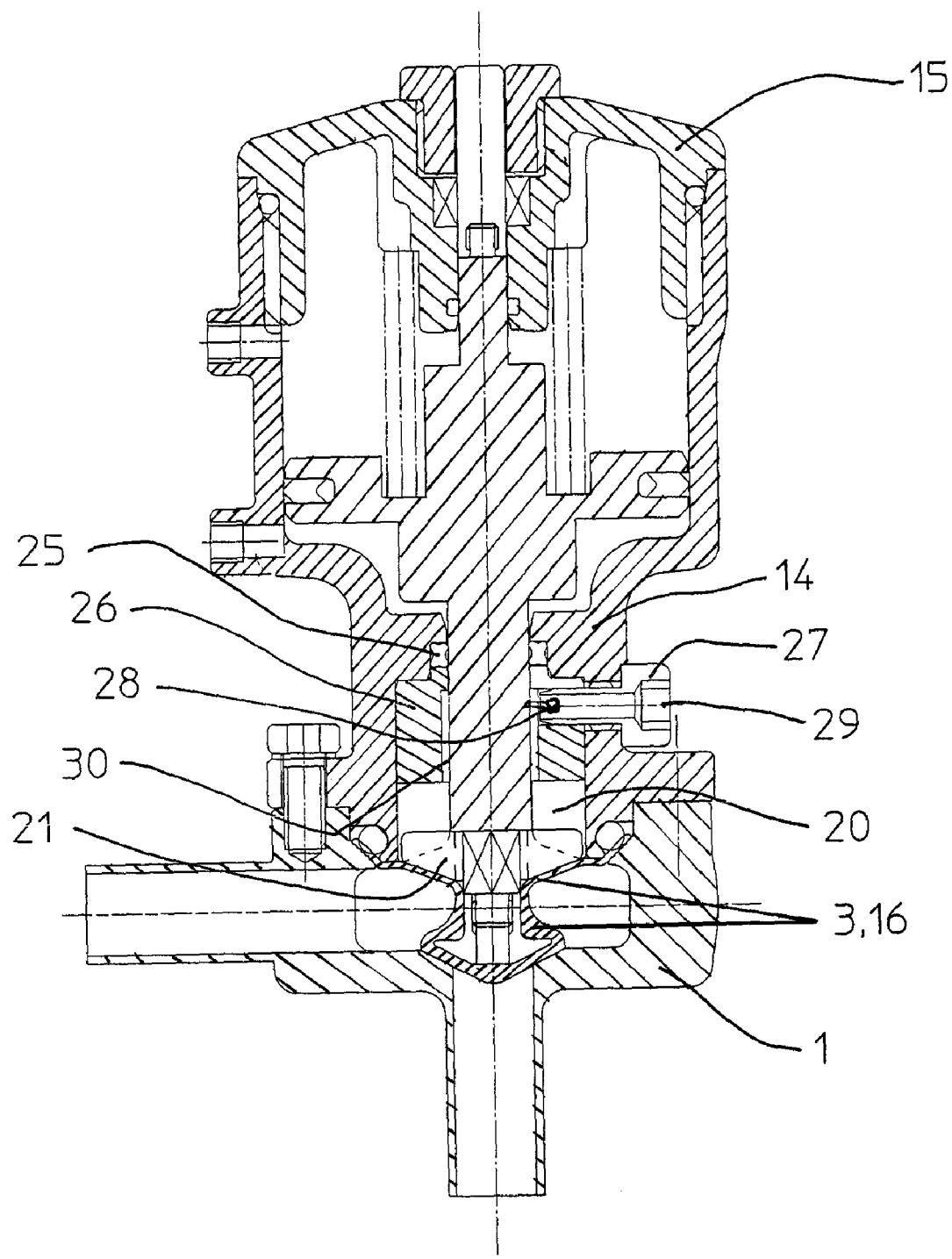
FIG. 4 shows the development of such valves claimed by the present application, for example in the form of a sterile valve.

FIG. 4 shows in further detail and by way of example, the realization of a single-seat valve of the type claimed by the present application in the form of a sterile valve.

In the figure, the serrated lock washer 20, which is stationary, is detachably mounted in the valve housing 1, and in the operating position shown acts simultaneously as a radially lower stem rod guide. This serrated lock washer 20 or its associated retaining parts in the form of the actual serration holders 26, also fix at least one upper stem seal 25 in position in terms of height. At least one stem seal 25 of the serrated lock washer 20 or a spacer that can press against its upper end service can also be locked in a specified axial position. An additional serration holder 26 can also be advantageously provided between the upper end surface of the serrated lock washer 20 and the associated end surface of the stem seal 25.

The serration holder 26 or the serrated lock washer 20 can also have, for example, a fastening device 27 that extends radially and can also be adjusted or fixed in position externally. It has therefore been found to be advantageous if the serration holder 26 is detachably fastened by means of a set screw 28. This space that contains the serrated lock washer 20 and its holder 26 also has a leakage channel 29 that runs toward the outside. This channel can be routed toward the outside through the provided fastening device 27 or the integrated set screw 28. At least in the vicinity of the serration holder 26, the leakage channel 29 can also be realized in the form of an encircling ring-shaped channel 30. A particularly advantageous and simple realization of the valve thereby becomes possible as a result of the association of the various tasks for the components that correspond to one another.

Figure 4A:
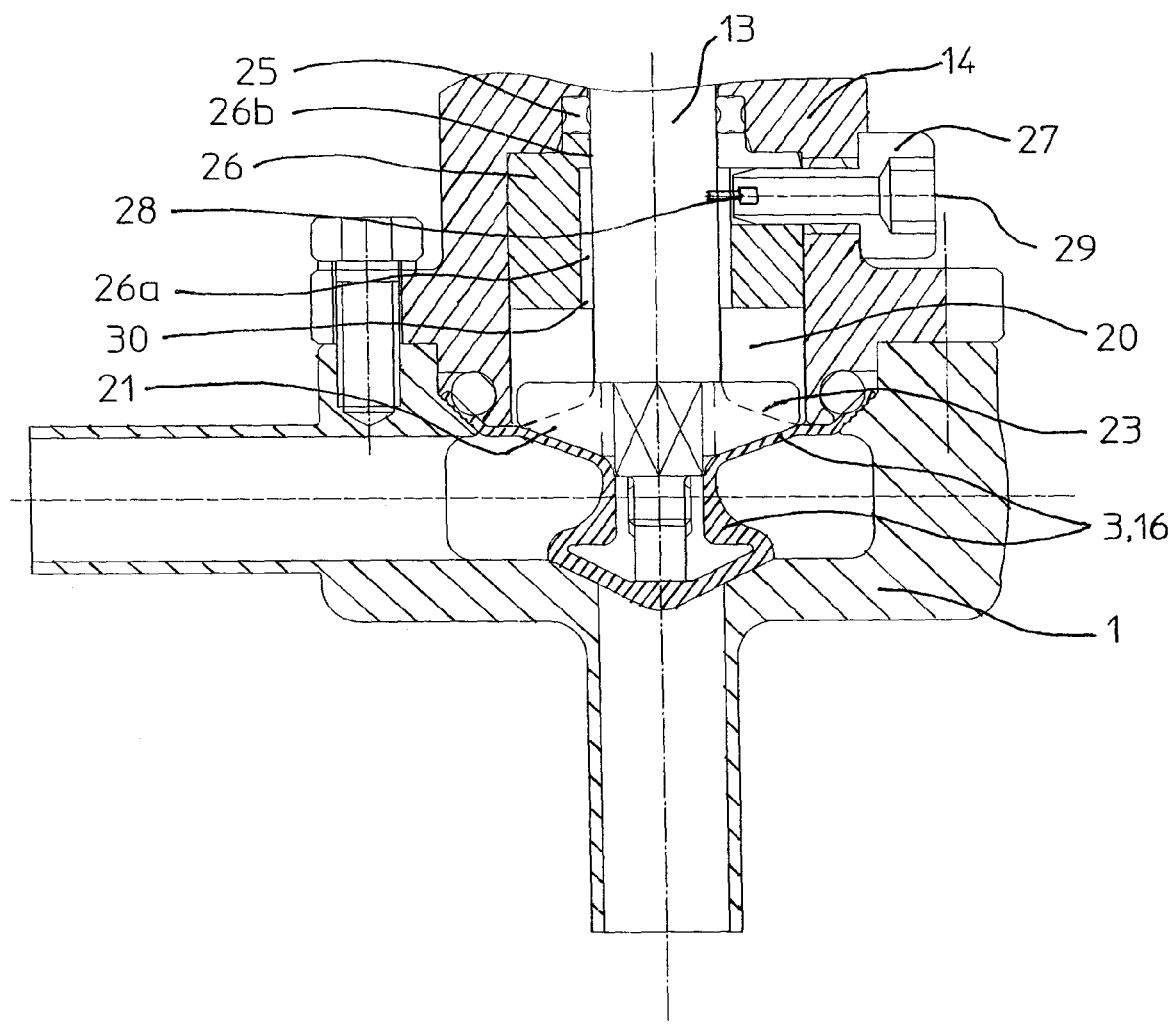
FIG. 4A shows an expanded view of a portion of the device shown in FIG. 4.
Figure 4B:
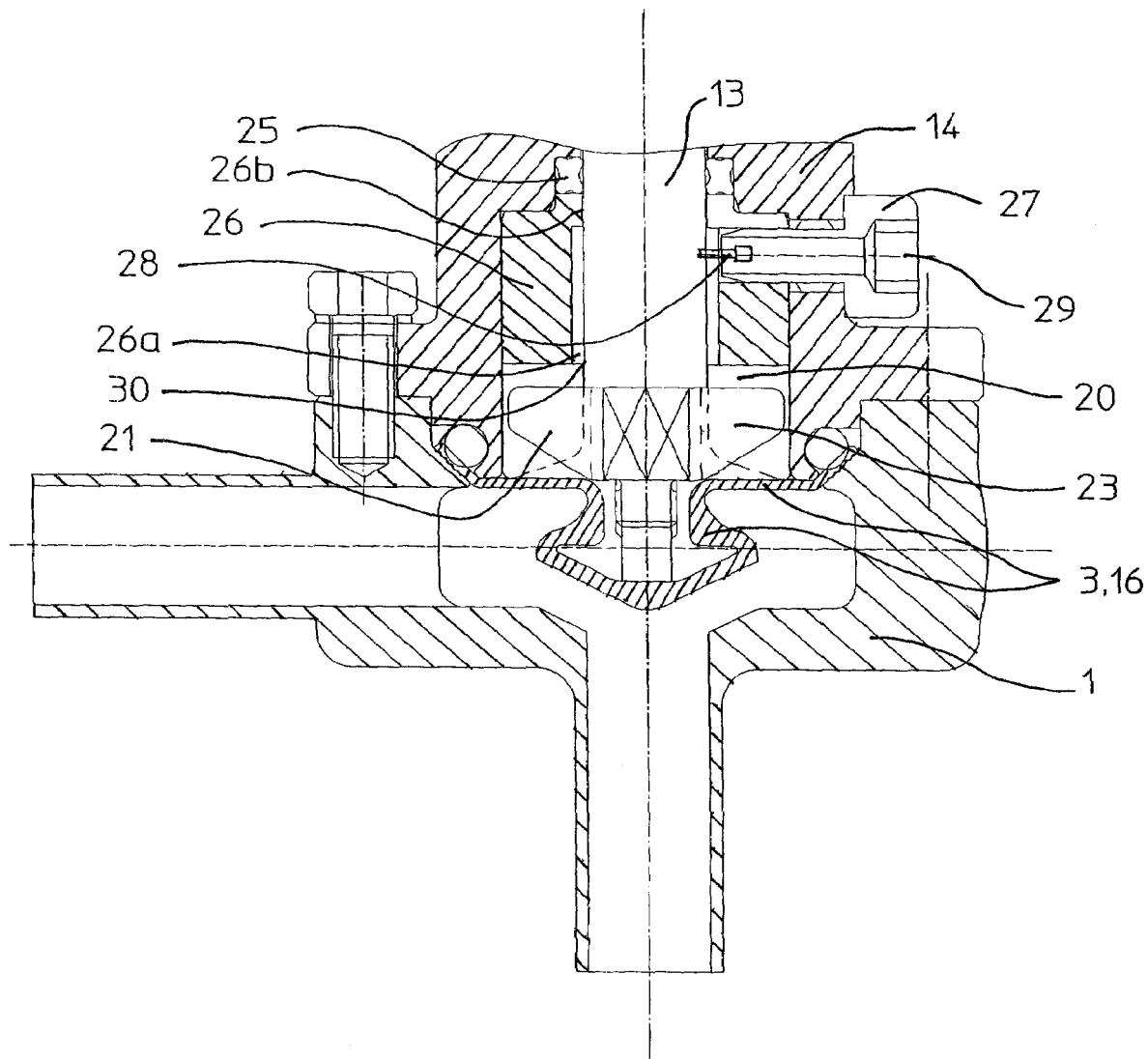
FIG. 4B shows the view of the device as shown in FIG. 4A, but with the valve partially open.

FIG. 4A shows an expanded view of a portion of the valve device shown in FIG. 4. In this expanded view webs 23 of the serrated stem 21 are indicated. Also marked are two surfaces of the serration holder 26. The first surface 26a is the surface of the serration holder 26 that helps define the ring-shaped channel 30. The second surface 26b is the surface that contacts and helps guide the stem rod 13. FIG. 4B shows the view of the device as shown in FIG. 4A, but with the valve partially open. As can be clearly seen in FIG. 4B, the serrated stem 21 and the webs 23 thereof have been moved upwardly relative to the serrated lock washer 20, which is in a stationary position. According to at least one possible embodiment, the webs 23 are in a complementary engagement with the serrated lock washer 20. This engagement substantially prevents or at least minimizes radial movement and rotational movement of the serrated stem 21 and the stem rod 13 to minimize wear and damage of the membrane 3, 16. This engagement also acts as an axial guide of the serrated stem 21 and the stem rod 13 during the axial movement thereof during opening and closing of the valve.

Figure 5:
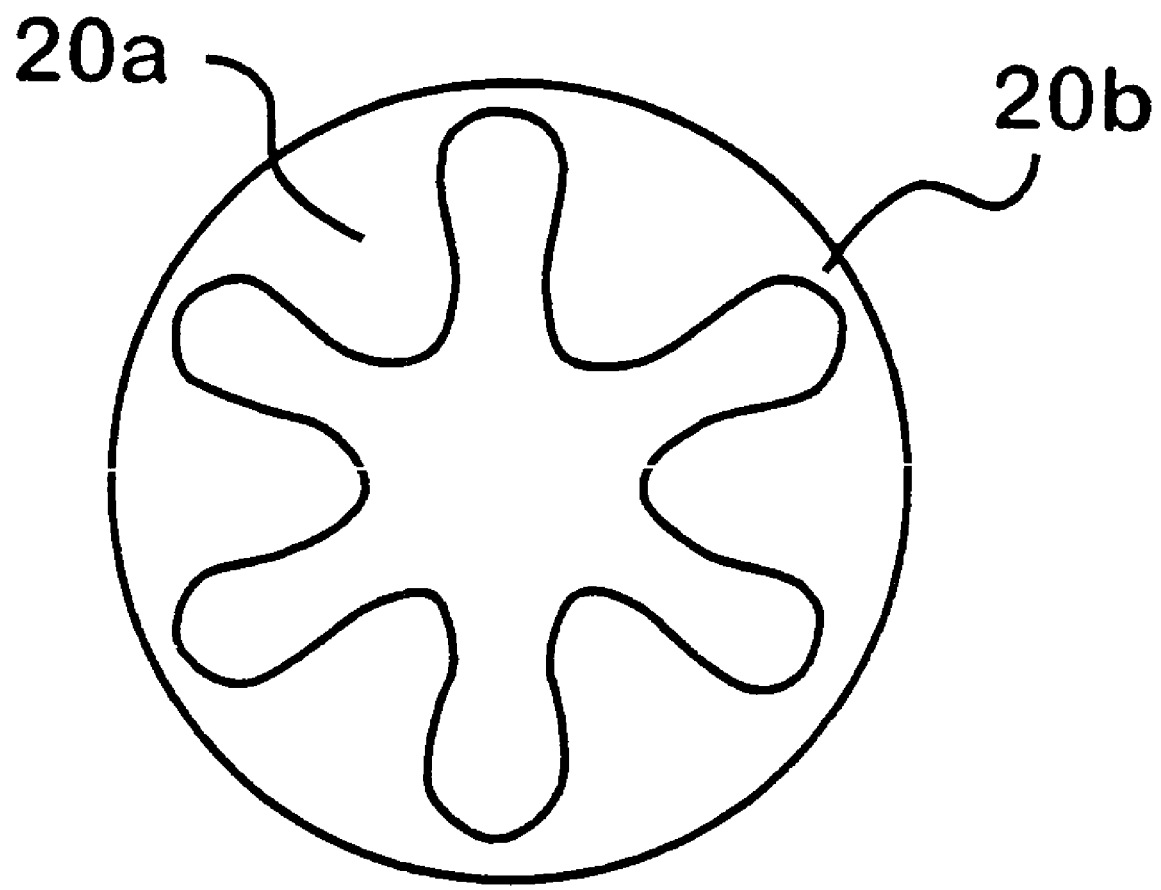
FIG. 5 shows one possible embodiment of a lock washer for use in at least one possible embodiment of a membrane valve structure.

FIG. 5 shows one possible embodiment of a lock washer for use in at least one possible embodiment of a membrane valve structure. In the embodiment shown, the lock washer is shown along an axial view and comprises an outer ring portion 20b and projecting portions 20a. The projecting portions 20a are substantially curvilinear over their entire surface and have rounded ends. A lock washer of this type would be paired with a serrated stem having complementary projections that would fit into and be guided in the spaces between the projecting portions 20a. A stem rod or other stem structure could be inserted through the lock washer, and the end points of the rounded ends of the projecting portions 20a could be in contact with the stem rod to axially guide it and prevent radial movement. Such a lock washer could be utilized in a valve device such as shown in FIG. 4. Of course, the lock washer shown in FIG. 5 is only one possible embodiment, and a number of other configurations are possible and within the scope of the application. Further, the embodiment of the lock washer shown in FIG. 5 should not in any way be construed as limiting the lock washer 20 or any other component shown in the embodiment of the valve device shown in the other figures, such as FIG. 4.

Figure 6:
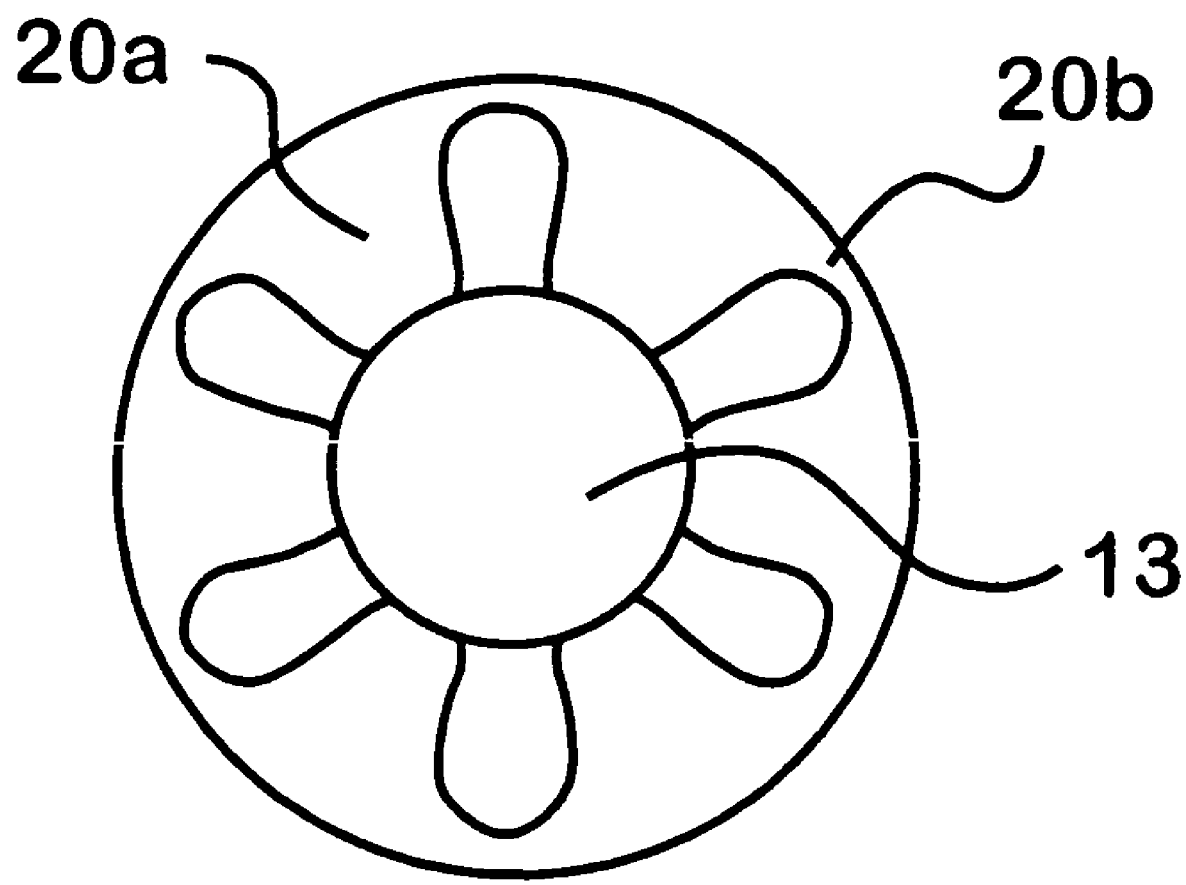
FIG. 6 shows another possible embodiment of a lock washer for use in at least one other possible embodiment of a membrane valve structure.
Figure 7:
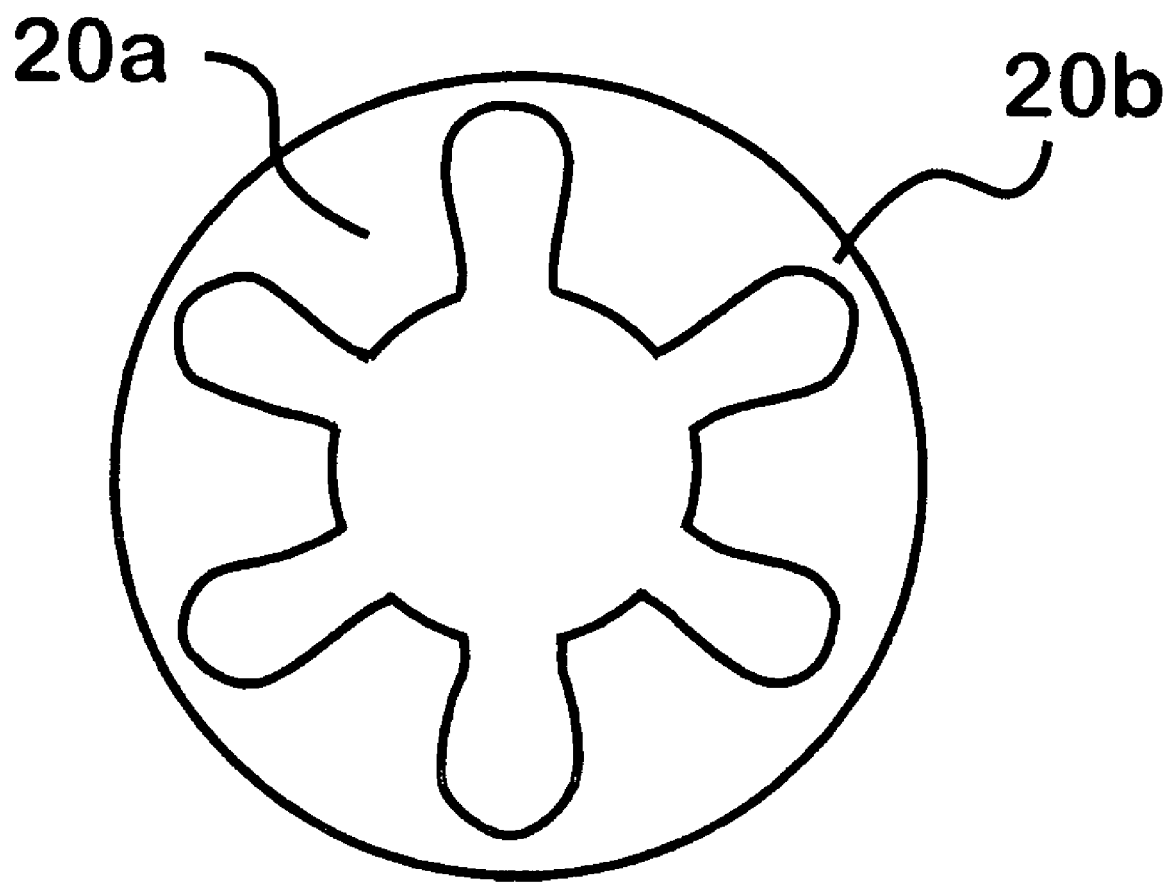
FIG. 7 shows a view of the lock washer shown in FIG. 6.

FIG. 6 shows another possible embodiment of a lock washer for use in at least one other possible embodiment of a membrane valve structure. FIG. 6 shows a lock washer similar to FIG. 5 in that the projecting portions 20a are substantially curvilinear. However, the ends of the projecting portions 20a that contact the stem rod 13 have a concave shape that corresponds to the circular outer surface of the stem rod 13. This particular configuration provides increased support and guiding of the stem rod 13 by the projecting portions 20a over that of the embodiment shown in FIG. 5. FIG. 7 shows a view of the lock washer shown in FIG. 6 without the stem rod 13. The lock washer shown in FIGS. 6 and 7 is only one possible embodiment, and a number of other configurations are possible and within the scope of the application. Further, the embodiment of the lock washer shown in FIGS. 6 and 7 should not in any way be construed as limiting the lock washer 20 or any other component shown in the embodiment of the valve device shown in the other figures, such as FIG. 4.

Figure 8:
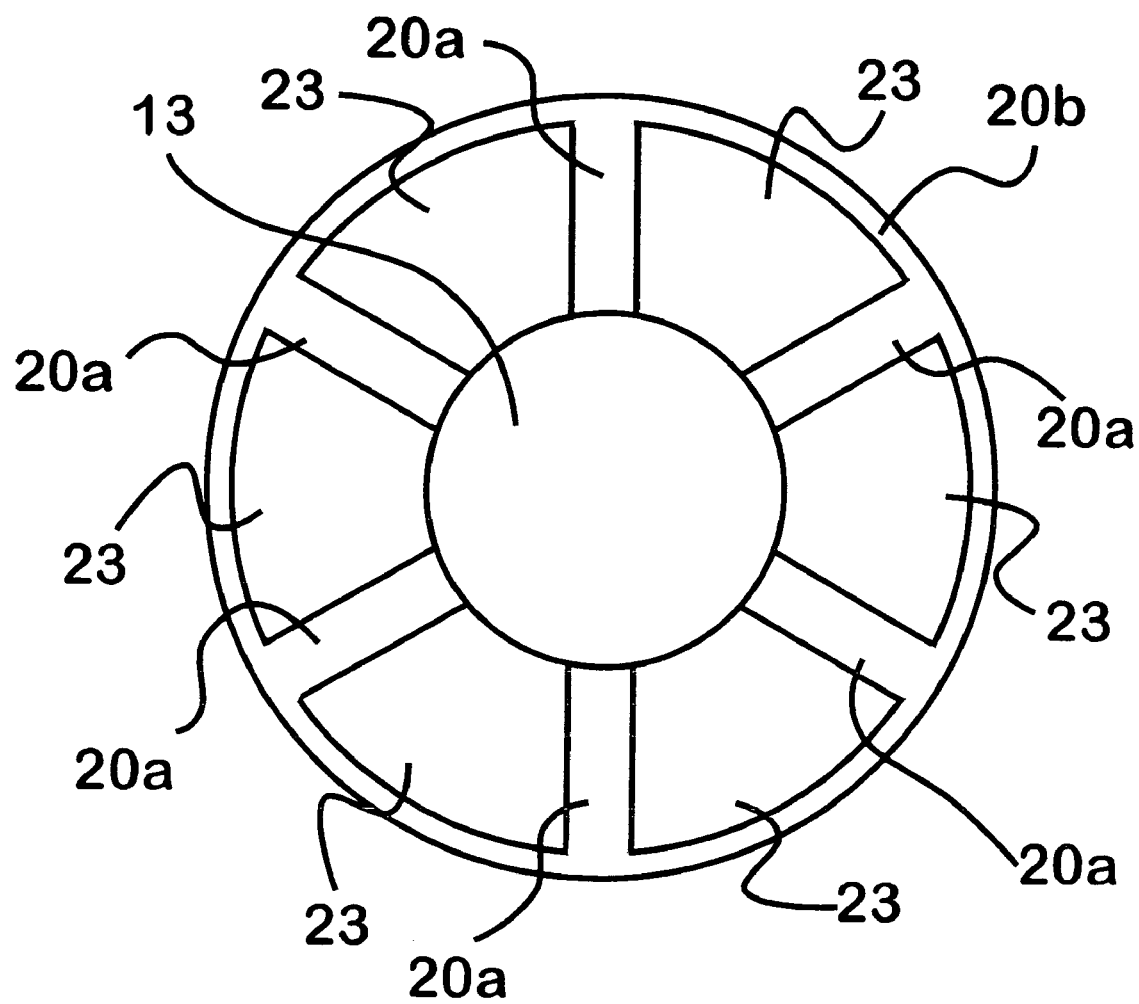
FIG. 8 shows a view of yet another possible embodiment of a portion of a membrane valve structure.

FIG. 8 shows a view of yet another possible embodiment of a portion of a membrane valve structure along an axial view. In this particular embodiment, the projecting portions 20a of the lock washer have straight parallel sides to form an overall fin shape. The ends of the projecting portions 20a that contact the stem rod 13 have a concave shape that corresponds to the circular outer surface of the stem rod 13. The webs or projections 23 engage the lock washer in the spaces in between the projecting portions 20a. In the embodiment shown in FIG. 8, the fins or projecting portions 20a, given their lesser thickness with respect to the webs 23, can be made of a sufficiently rigid or stiff material, such as metal or a very hard plastic, to substantially prevent or minimize rotational movement of the stem rod 13. In addition, the webs 23 and/or the projecting portions 20a and ring portion 20b can be made of a material that is very smooth and minimizes the friction between contacting surfaces to facilitate the axial movement of the stem rod and to minimize friction-induced wear on the contacting surfaces. The webs 23, when engaged in the lock washer, substantially prevent or minimize radial movement of the stem rod 13. As discussed above, the minimization of movement of the stem rod 13, whether radial or rotational, is important to maintaining the structural integrity and functionality of the membrane connected thereto. If during the use of the valve there is substantial or repetitive radial or rotational movement of the stem rod, the wear on the membrane will increase. The membrane will then be much more likely to tear, or the membrane thickness will have to be increased to compensate for the wearing movements of the stem rod, which usually results in decreased flexibility. In addition, the axial movement of the stem rod may be negatively affected if there is substantial radial movement. The stem rod may not slide or move axially very well if the stem rod is being displaced radially, or it may not move as well if its axial movement was consistent and guided by a guide structure.

In the embodiment shown in FIG. 8, the webs are of a substantial width or thickness to provide increased surface area with which to contact the membrane. As can be seen in FIG. 4A, when the valve is closed, the webs 23 press against the membrane 3. If the webs 23 have a large contact surface, they will provide increased support to the membrane 3 to substantially prevent or minimize deformation thereof or damage thereto. However, this is only one possible embodiment and the webs 23 could be configured to be smaller than or substantially equal in size to the corresponding projecting portions 20a of the lock washer.

Figure 9:
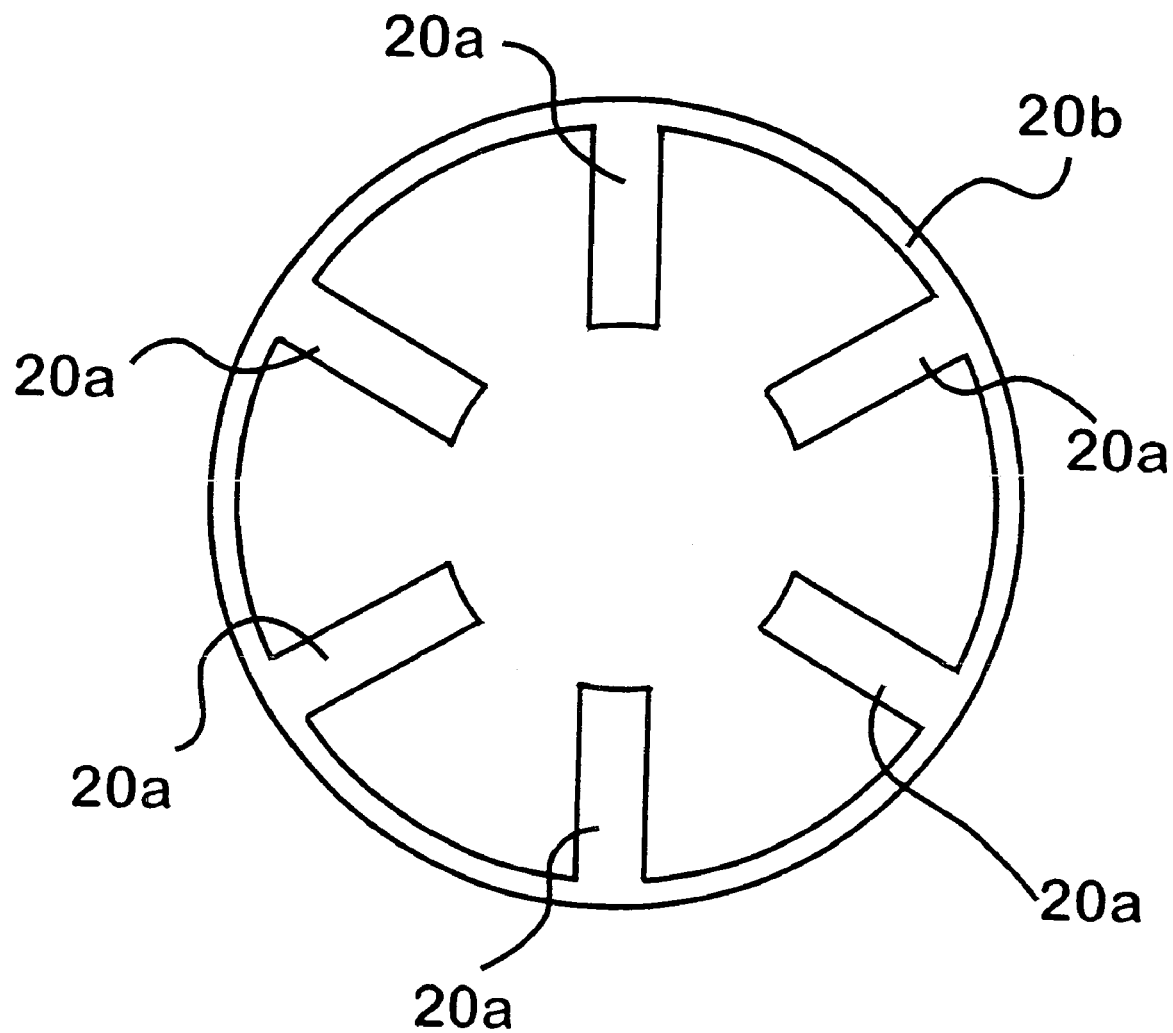
FIG. 9 shows a view of the lock washer shown in FIG. 8.
Figure 10:
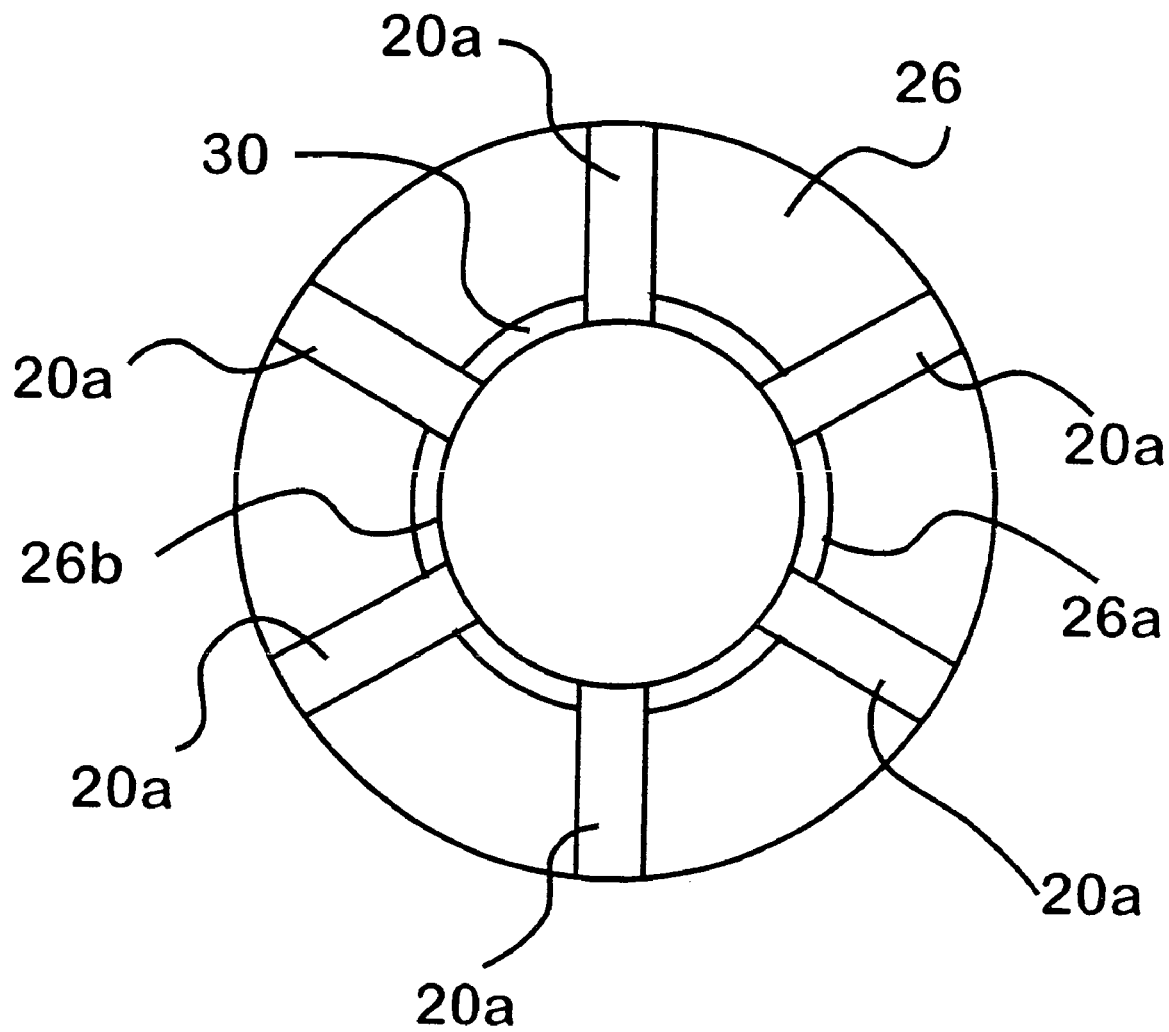
FIG. 10 shows another view of the embodiment of a portion of the membrane valve structure shown in FIG. 8.

FIG. 9 shows a view of the lock washer shown in FIG. 8, without the stem rod 13 or webs 23. FIG. 10 shows another view of the embodiment of a portion of the membrane valve structure shown in FIG. 8, wherein the ring-shaped channel 30 and the first and second surfaces 26a, 26b of the serration holder 26 are shown. The embodiment shown in FIGS. 8-10 is only one possible embodiment, and a number of other configurations are possible and within the scope of the application. Further, the embodiment shown in FIGS. 8-10 should not in any way be construed as limiting the any components shown in the embodiment of the valve device shown in the other figures, such as FIG. 4.

The number of webs 23 and projecting portions 20a in each of FIGS. 5-10 is six. However, this number was selected for exemplary purposes only. A greater number, such as 7, 8, 9, 10, 11, 12, 13, 14, 15, or 16, or a lesser number, such as 2, 3, 4, or, 5, of webs 23 or projecting portions 20a could be utilized as desired in at least one possible embodiment. However, the number should be selected such that friction between contacting surfaces is not increased substantially, and such that radial and rotational movement of the stem rod is minimized to a sufficient level.

In at least one possible embodiment, the webs 23 may not be in contact with the projecting portions 20a. There may be a gap or space between the webs 23 and the projecting portions 20a so that they are not in contact and wear due to friction would be minimized since any friction would be virtually eliminated.

In at least one possible embodiment, the leakage channel 29 can be used to allow air to leak out of the chamber that houses the lock washer 20, the serration holder 26, etc., in order to substantially prevent or minimize build up of pressure in the chamber. Such pressure could negatively impact the membrane 3 by causing the deformation or tearing thereof. The leakage channel 29 could allow such pressure to be bled off before an undesirable build up occurs.

One feature or aspect of an embodiment is believed at the time of the filing of this patent application to possibly reside broadly in a membrane valve with a membrane which is mounted in a sealed manner in a valve housing and separates a control compartment or a movable valve rod from the product compartment, with a serrated support device for the stabilization and support of the inserted membrane, characterized in that a stationary serrated lock washer is detachably mounted in the valve housing, and in its operating position is simultaneously realized in the form of a radial shaft guide.

Another feature or aspect of an embodiment is believed at the time of the filing of this patent application to possibly reside broadly in a membrane valve, characterized in that at least one stem seal facing the actuator drive can be fixed in position by means of the serrated lock washer and/or its supporting parts.

Yet another feature or aspect of an embodiment is believed at the time of the filing of this patent application to possibly reside broadly in a membrane valve, characterized in that at least one stem seal is locked in its axial sealing plane by the serrated lock washer or by a spacer element that can be inserted against its upper end surface.

Still another feature or aspect of an embodiment is believed at the time of the filing of this patent application to possibly reside broadly in a membrane valve, characterized in that an additional serration holder is provided between the upper end surface of the serrated lock washer and the stem seal.

A further feature or aspect of an embodiment is believed at the time of the filing of this patent application to possibly reside broadly in a membrane valve, characterized in that the serrated lock washer and/or the serration holder is held in place by means of a fastening device that extends radially and can be adjusted and/or fixed in position externally.

Another feature or aspect of an embodiment is believed at the time of the filing of this patent application to possibly reside broadly in a membrane valve, characterized in that the serrated lock washer and/or serration holder is detachably held in place by means of a set screw.

Yet another feature or aspect of an embodiment is believed at the time of the filing of this patent application to possibly reside broadly in a membrane valve, characterized in that the serrated lock washer and/or the serration holder has at least one outwardly leading leakage channel.

Still another feature or aspect of an embodiment is believed at the time of the filing of this patent application to possibly reside broadly in a membrane valve characterized in that the serration holder has at least one leakage channel that begins above the end surface of the serrated lock washer.

A further feature or aspect of an embodiment is believed at the time of the filing of this patent application to possibly reside broadly in a membrane valve, characterized in that the leakage channel is realized, at least in the vicinity of the serration holder, in the form of an encircling ring channel.

Another feature or aspect of an embodiment is believed at the time of the filing of this patent application to possibly reside broadly in a membrane valve, characterized in that the serrated lock washer and/or the serration holder is/are detachably held by a set screw that has a leakage channel that leads to the outside.

Yet another feature or aspect of an embodiment is believed at the time of the filing of this patent application to possibly reside broadly in a membrane valve, characterized in that the serrated lock washer and stem rod that correspond to each other and slide in relation to each other are made of plastic and/or by precision casting.

A further feature or aspect of an embodiment is believed at the time of the filing of this patent application to possibly reside broadly in a food and beverage industry membrane valve structure comprising: a housing comprising a product chamber and an equipment chamber; said product chamber being configured and disposed to permit passage of a food or beverage product there through; a membrane being configured and disposed to separate said product chamber from said equipment chamber and to minimize entry of food or beverage product into said equipment chamber; said equipment chamber being configured and disposed to house equipment to move said membrane to control passage of a food or beverage product through said product chamber; said equipment comprising: a valve rod being axially movable to move said membrane; a drive device being configured and disposed to axially move said valve rod; a valve body being configured and disposed to be moved by said valve rod to move said membrane; said valve body comprising a plurality of radially extending projections being configured and disposed to stabilize and support said membrane upon movement of said membrane; a guide structure being detachably mounted in said housing and comprising a plurality of projections; said plurality of projections being disposed about said valve rod to minimize radial movement of said valve rod and to axially guide said valve rod; and said plurality of projections of said valve body being configured and disposed to move and be guided in corresponding spaces between said plurality of projections of said guide structure upon movement of said valve rod.

Still another feature or aspect of an embodiment is believed at the time of the filing of this patent application to possibly reside broadly in a food and beverage industry membrane valve structure comprising: a housing comprising a product chamber and an equipment chamber; said product chamber being configured and disposed to permit passage of a food or beverage product there through; a membrane being configured and disposed to separate said product chamber from said equipment chamber and to minimize entry of food or beverage product into said equipment chamber; said equipment chamber being configured and disposed to house equipment to move said membrane to control passage of a food or beverage product through said product chamber; said equipment comprising: a valve rod being axially movable to move said membrane; a drive device being configured and disposed to axially move said valve rod; a valve body being configured and disposed to be moved by said valve rod to move said membrane; said valve body comprising a plurality of radially extending projections being configured and disposed to stabilize and support said membrane upon movement of said membrane; a guide structure being detachably mounted in said housing and comprising a plurality of projections; and said plurality of projections being disposed about said valve rod to minimize radial movement of said valve rod and to axially guide said valve rod.

This application relates to a membrane valve with a membrane which is mounted in a sealed manner in a valve housing and separates a control compartment or a movable valve rod from the product compartment, with a serrated support device for the stabilization and support of the inserted membrane, characterized in that a stationary serrated lock washer is detachably mounted in the valve housing, and in its operating position is simultaneously realized in the form of a radial shaft guide.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

The corresponding foreign patent publication applications, namely, Federal Republic of Germany Patent Application No. 10 2005 016 387.4, filed on Apr. 9, 2005, having inventors Dieter Schulz and Frank Baumbach, and DE-OS 10 2005 016 387.4 and DE-PS 10 2005 016 387.4, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A food and beverage industry membrane valve structure comprising:
    a housing comprising a product chamber and an equipment chamber;
    said product chamber being configured and disposed to permit passage of a food or beverage product there through;
    a membrane being configured and disposed to separate said product chamber from said equipment chamber and to minimize entry of food or beverage product into said equipment chamber;
    said equipment chamber being configured and disposed to house equipment to move said membrane to control passage of a food or beverage product through said product chamber;
    said equipment comprising:
        a valve rod being axially movable to move said membrane;
        a drive device being configured and disposed to axially move said valve rod;
        a valve body being configured and disposed to be moved by said valve rod to move said membrane;
        said valve body comprising a plurality of radially extending projections configured and disposed to stabilize and support said membrane upon movement of said membrane;
    a guide structure being detachably mounted in said housing and comprising a plurality of projections;
    said plurality of projections being disposed about said valve rod to minimize radial movement of said valve rod and to axially guide said valve rod; and
    said plurality of projections of said valve body being configured and disposed to move and be guided in corresponding spaces between said plurality of projections of said guide structure upon movement of said valve rod.

2. The membrane valve structure according to claim 1, wherein:
    said guide structure comprises one of:
        a unitary, single-piece structure; and
        an at least two part structure comprising: a first structure comprising said projections and a separate, second structure comprising a spacer piece disposed between said first structure and said drive device;
    said equipment comprises at least one seal disposed about said valve rod and adjacent said drive device; and
    said at least one seal being configured to be retained in position by said guide structure.

3. The membrane valve structure according to claim 2, wherein:
    said membrane valve structure comprises a fastening device;
    said fastening device is configured and disposed to removably attach said guide structure to said housing;
    said fastening device extends radially and is configured to be adjusted or fixed in position externally.

4. The membrane valve structure according to claim 3, wherein:
    said fastening device comprises a set screw; and
    said guide structure comprises at least one outwardly leading leakage channel to permit leakage of air from said housing.

5. The membrane valve structure according to claim 4, wherein:
    said set screw comprises said leakage channel; and
    said guide structure and said valve rod are each made of one of:
        plastic; and
        precision cast metal.

6. The membrane valve structure according to claim 5, wherein one of (A) and (B):
    (A) said spacer piece comprises said at least one leakage channel; and
    said at least one leakage channel begins above the end surface of said first structure comprising said projections; and
    (B) said at least one leakage channel comprises an encircling ring channel adjacent said spacer piece.

7. A food and beverage industry membrane valve structure comprising:
    a housing comprising a product chamber and an equipment chamber;
    said product chamber configured and disposed to permit passage of a food or beverage product there through;
    a membrane configured and disposed to separate said product chamber from said equipment chamber and to minimize entry of food or beverage product into said equipment chamber;
    said equipment chamber configured and disposed to house equipment to move said membrane to control passage of a food or beverage product through said product chamber;
    said equipment comprising:
        a valve rod being axially movable to move said membrane;
        a drive device configured and disposed to axially move said valve rod;

a valve body configured and disposed to be moved by said valve rod to move said membrane;

said valve body comprising a plurality of radially extending projections configured and disposed to stabilize and support said membrane upon movement of said membrane;

a guide structure being detachably mounted in said housing and comprising a plurality of projections; and said plurality of projections being disposed about said valve rod to minimize radial movement of said valve rod and to axially guide said valve rod.

8. The membrane valve structure according to claim 7, wherein:

said guide structure comprises one of:
a unitary, single-piece structure; and
an at least two part structure comprising: a first structure comprising said projections and a separate, second structure comprising a spacer piece disposed between said first structure and said drive device;

said equipment comprises at least one seal disposed about said valve rod and adjacent said drive device; and said at least one seal being configured to be retained in position by said guide structure.

9. The membrane valve structure according to claim 8, wherein:

said membrane valve structure comprises a fastening device;

said fastening device is configured and disposed to removably attach said guide structure to said housing;

said fastening device extends radially and is configured to be adjusted or fixed in position externally.

10. The membrane valve structure according to claim 9, wherein:

said fastening device comprises a set screw; and said guide structure comprises at least one outwardly leading leakage channel to permit leakage of air from said housing.

11. The membrane valve structure according to claim 10, wherein:

said set screw comprises said leakage channel; and said guide structure and said valve rod are each made of one of:
plastic; and
precision cast metal.

12. A membrane valve with a membrane which is mounted in a sealed manner in a valve housing and separates a control compartment or a movable valve rod from a product compartment, with a serrated support device for the stabilization and support of the membrane, wherein a stationary serrated lock washer having an upper end surface is detachably mounted in the valve housing, and in its operating position comprises a radial shaft guide.

13. The membrane valve according to claim 12, wherein at least one stem seal facing an actuator drive can be fixed in position by means of the serrated lock washer and/or by means of parts of the membrane valve configured to support the serrated lock washer.

14. The membrane valve according to claim 13, wherein at least one stem seal is locked in its axial sealing plane by the serrated lock washer or by a spacer element that can be inserted against the upper end surface.

15. The membrane valve according to claim 14, wherein an additional serration holder is provided between the upper end surface of the serrated lock washer and the stem seal.

16. The membrane valve according to claim 15, wherein the serrated lock washer and/or the serration holder is held in place by means of a fastening device that extends radially and can be adjusted and/or fixed in position externally.

17. The membrane valve according to claim 16, wherein the serrated lock washer and/or serration holder is detachably held in place by means of a set screw.

18. The membrane valve according to claim 17, wherein the serrated lock washer and/or the serration holder has at least one outwardly leading leakage channel.

19. The membrane valve according to claim 18, wherein:
the serration holder has at least one leakage channel that begins above the end surface of the serrated lock washer;
the leakage channel comprises an encircling ring channel adjacent said spacer piece;
the serrated lock washer and/or the serration holder is/are detachably held by a set screw that has a leakage channel that leads to the outside; and
the serrated lock washer and stem rod that correspond to each other and slide in relation to each other are made of plastic and/or by precision casting.

* * * * *